(12) United States Patent
Ragan et al.

(10) Patent No.: US 9,022,209 B2
(45) Date of Patent: May 5, 2015

(54) CLEANABLE CONVEYOR-BELT DRIVE SYSTEM

(71) Applicant: Laitram, L.L.C., Harahan, LA (US)

(72) Inventors: Bryant G. Ragan, Metairie, LA (US); Robert L. Rosen, New Orleans, LA (US)

(73) Assignee: Laitram, L.L.C., Harahan, LA (US)

( * ) Notice: Subject to any disclaimer, the term of this patent is extended or adjusted under 35 U.S.C. 154(b) by 9 days.

(21) Appl. No.: 14/032,623

(22) Filed: Sep. 20, 2013

(65) Prior Publication Data

US 2015/0083554 A1    Mar. 26, 2015

(51) Int. Cl.
*B65G 23/08* (2006.01)
*B65G 23/22* (2006.01)
*B65G 23/04* (2006.01)

(52) U.S. Cl.
CPC ............... *B65G 23/22* (2013.01); *B65G 23/04* (2013.01)

(58) Field of Classification Search
USPC ............. 198/619, 788, 789, 834; 310/156.36, 310/156.37
See application file for complete search history.

(56) References Cited

U.S. PATENT DOCUMENTS

| | | | |
|---|---|---|---|
| 2,873,843 A | 2/1959 | Wilson | |
| 3,064,797 A * | 11/1962 | Besel et al. | 198/813 |
| 3,169,632 A | 2/1965 | Kain | |
| 3,208,296 A | 9/1965 | Baermann | |
| 3,497,056 A | 2/1970 | Clark | |
| 4,054,202 A | 10/1977 | Hautemont | |
| 4,067,438 A | 1/1978 | Spurr et al. | |
| 4,121,127 A | 10/1978 | Adelski et al. | |
| 4,278,164 A | 7/1981 | Matsui et al. | |
| 4,598,240 A | 7/1986 | Gale et al. | |
| 4,730,136 A | 3/1988 | Mueller | |
| 4,771,197 A * | 9/1988 | Ivanto et al. | 310/67 R |
| 4,775,044 A | 10/1988 | Hoeffling | |
| 4,805,761 A | 2/1989 | Totsch | |
| 4,832,183 A | 5/1989 | Lapeyre | |
| 4,882,511 A | 11/1989 | Vonder Heide | |
| 5,156,263 A * | 10/1992 | Ledet | 198/834 |
| 5,172,803 A | 12/1992 | Lewin | |
| 5,253,748 A | 10/1993 | Ledet | |
| 5,342,180 A * | 8/1994 | Daoud | 417/412 |

(Continued)

FOREIGN PATENT DOCUMENTS

EP    0811567 A2    10/1997
GB    2286733 A     8/1995

(Continued)

OTHER PUBLICATIONS

Massimo Fabri, Pier Luigi Ribani, Davide Zuffa, "Design and Testing of a magnetically Levitated Conveyor," IEEE Transactions on Magnetics, Jan. 2013, pp. 577-585, vol. 49, No. 1.

(Continued)

*Primary Examiner* — Douglas Hess
(74) *Attorney, Agent, or Firm* — James T. Cronvich

(57) ABSTRACT

A hygienic drive system for a belt conveyor. The drive system has a stator rigidly mounted in a housing having an outer bearing surface that is continuous with the outer surface of mounting supports and avoids hard-to-clean nooks. A rotor assembly formed by drive wheels rotatably mounted on the outer surface of the housing or by a magnetic belt wrapped around a portion of the outer surface is rotated by a rotating magnetic wave produced by the stator. The stator and rotor can form an induction motor or a synchronous motor.

24 Claims, 9 Drawing Sheets

(56) References Cited

U.S. PATENT DOCUMENTS

| | | |
|---|---|---|
| 6,244,427 B1 | 6/2001 | Syverson |
| 6,279,728 B1 | 8/2001 | Jung et al. |
| 6,302,275 B1 | 10/2001 | Shuttleworth et al. |
| 6,455,960 B1 | 9/2002 | Trago et al. |
| 6,528,908 B1 | 3/2003 | Lee |
| 6,607,073 B2 | 8/2003 | Buchi et al. |
| 6,710,505 B1 * | 3/2004 | Barani et al. ............... 310/261.1 |
| 6,719,127 B2 * | 4/2004 | Depaso et al. ................ 198/834 |
| 6,879,078 B2 | 4/2005 | Wolters |
| 6,891,299 B2 * | 5/2005 | Coupart et al. .......... 310/156.55 |
| 7,049,718 B2 | 5/2006 | Nickel-Jetter |
| 7,112,901 B1 * | 9/2006 | Soitu .......................... 310/67 R |
| 7,296,675 B1 | 11/2007 | Shuttleworth et al. |
| 7,299,915 B2 * | 11/2007 | El-Ibiary ...................... 198/788 |
| 7,329,215 B2 | 2/2008 | Umeda |
| 7,362,016 B2 | 4/2008 | Cheng |
| 7,565,967 B2 * | 7/2009 | Maine et al. .................. 198/835 |
| 7,597,186 B2 | 10/2009 | Chung et al. |
| 7,597,188 B2 | 10/2009 | Volpi |
| 7,597,190 B2 | 10/2009 | Lee |
| 7,615,894 B1 | 11/2009 | Deal |
| 7,987,970 B2 * | 8/2011 | Schwesig ...................... 198/788 |
| 7,994,672 B2 | 8/2011 | Mock |
| 8,166,628 B2 | 5/2012 | Akimoto et al. |
| 8,365,903 B2 | 2/2013 | Schmidt et al. |
| 8,485,350 B2 | 7/2013 | Reinisch et al. |
| 8,701,875 B2 * | 4/2014 | Arai .............................. 198/834 |
| 8,790,018 B2 * | 7/2014 | Leuver et al. ................. 384/546 |
| 8,919,539 B2 * | 12/2014 | Schmidt et al. .............. 198/788 |
| 2006/0011093 A1 | 1/2006 | Jensen et al. |

FOREIGN PATENT DOCUMENTS

| | | |
|---|---|---|
| GB | 2472020 A | 1/2011 |
| JP | H07-8331 U | 2/1995 |
| JP | 10231009 A1 | 9/1998 |
| JP | 2008150122 A | 7/2008 |
| WO | 9301646 A1 | 1/1993 |
| WO | 2007092843 A2 | 8/2007 |
| WO | 2009000239 A1 | 12/2008 |
| WO | 2010005300 A1 | 1/2010 |
| WO | 2010121303 A1 | 10/2010 |
| WO | 2013023202 A1 | 2/2013 |

OTHER PUBLICATIONS

International Search Report and Written Opinion of the International Searching Authority, PCT/US2014/053455, mailed Dec. 17, 2014, Korean Intellectual Property Office, Republic of Korea.

* cited by examiner

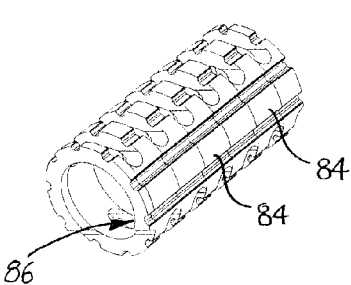
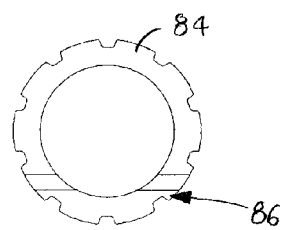
FIG. 10A     FIG. 10B
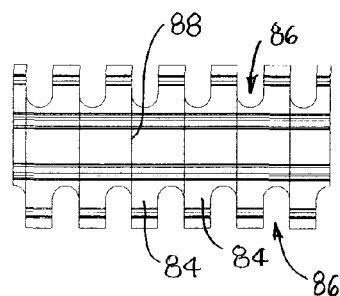
FIG. 10C
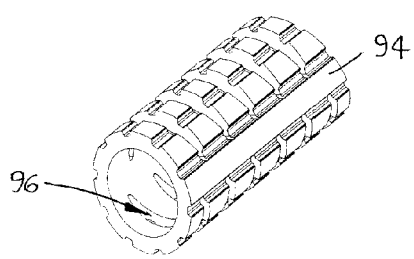
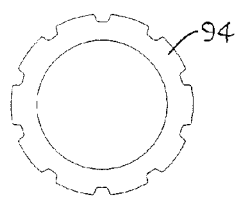
FIG. 11A     FIG. 11B
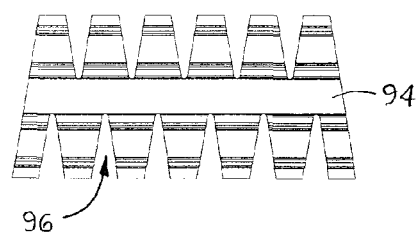
FIG. 11C

CLEANABLE CONVEYOR-BELT DRIVE SYSTEM

BACKGROUND

The invention relates generally to power-driven conveyors and more particularly to conveyor-belt drives.

Endless conveyor belts are commonly driven by pulleys or sprockets mounted on drive shafts driven by a motor and drive train, which could include a gearbox, a power-transmission belt, or a roller chain. The pulleys or sprockets, shafts, motors, and drive train are mounted in a conveyor frame. But all these components provide bacteria-harboring nooks and crannies that are difficult to clean. Even drum motors, which combine motor, drive train, and pulleys or sprockets in one package, require mounting components, which provide hard-to-clean areas. In hygienic applications, the ability to clean conveyors and their drive systems thoroughly is important.

SUMMARY

One version of a conveyor drive system embodying features of the invention comprises a housing having an interior region and a stationary outer bearing surface surrounding the interior region. A stator is housed in the interior region of the housing along an axis. The stator can be energized to produce a magnetic flux wave that rotates about the axis. A rotor has an inner bearing surface that contacts the outer bearing surface of the housing. The magnetic flux wave interacts with the rotor to rotate the rotor about the axis along the outer bearing surface of the housing.

Another version of a conveyor drive system comprises a tubular housing with a cylindrical outer surface that is elongated in an axial direction. A stationary stator is enclosed within the tubular housing. The stator can be energized to produce a magnetic flux wave that rotates about the axial direction. A rotor assembly has a central axial bore that is bounded by an inner bearing ring, which receives the outer bearing surface of the tubular housing. The rotor assembly also has an outer drive ring that is coaxial with the inner bearing ring. Drive structure on the periphery of the outer drive ring drives a conveyor belt. The magnetic flux wave interacts with the rotor assembly to rotate the rotor assembly along the outer bearing surface of the housing about the axial direction and drive the conveyor belt around a portion of the outer bearing surface of the housing.

BRIEF DESCRIPTION OF THE DRAWINGS

These features and others are described in more detail in the following description, appended claims, and accompanying drawings, in which:

FIGS. 10A, 10B, and 10C are isometric, side elevation, and front elevation views of one version of a cleanable rotor usable with the drive system of FIG. 1;

FIGS. 11A, 11B, and 11C are isometric, side elevation, and front elevation views of a second version of a cleanable rotor usable with the drive system of FIG. 1;

DETAILED DESCRIPTION

Figure 1:
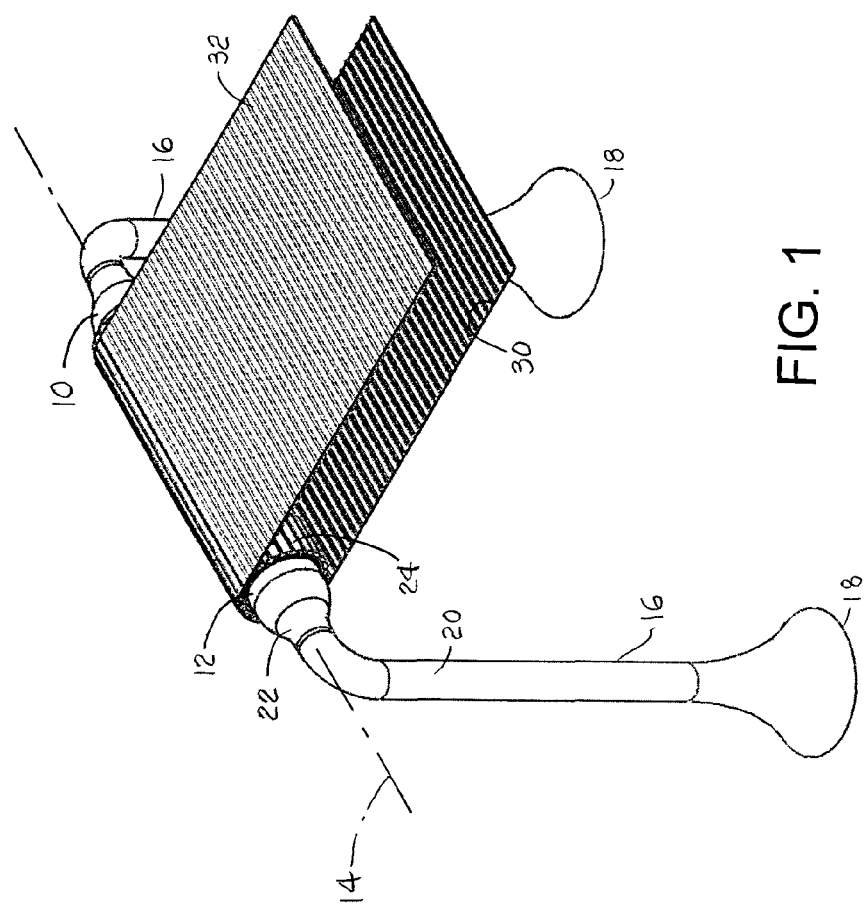
FIG. 1 is an isometric view of a conveyor-belt drive system embodying features of the invention.
Figure 2:
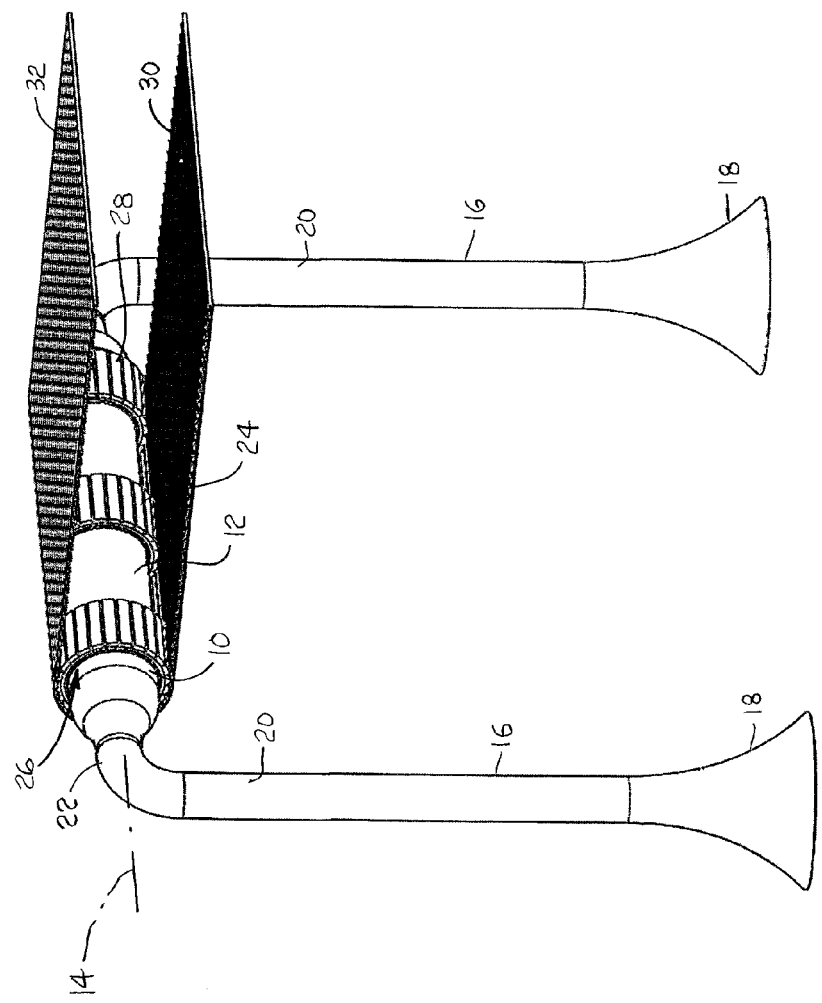
FIG. 2 is an oblique view of the drive system in FIG. 1.

One version of an easy-to-clean conveyor-belt drive system is shown in FIGS. 1 and 2. The drive system comprises a tubular housing 10 having an elongated cylindrical outer bearing surface 12 defining a central axis 14. In most conveyor layouts, the axis 14 would lie in a horizontal plane. The housing 10 is supported at opposite ends by mounting supports 16, shown as legs with feet 18 for floor-mounting. In the floor-mounted version, the legs are shown generally perpendicular to the axis 14 of the housing 10. But the mounting supports could be arranged differently for wall- or ceiling-mounting. And in some applications, the housing may require only a single support at one end. The outer surfaces 20 of the supports are continuous with the outer bearing surface 12 of the housing 10 and the outer surfaces 22 of transition sections between the legs 16 and the cylindrical tube 10. The continuous outer surface has a constant or monotonically decreasing diameter away from the middle of the housing to avoid forming nooks that can harbor bacteria or be hard to clean.

Figure 3:
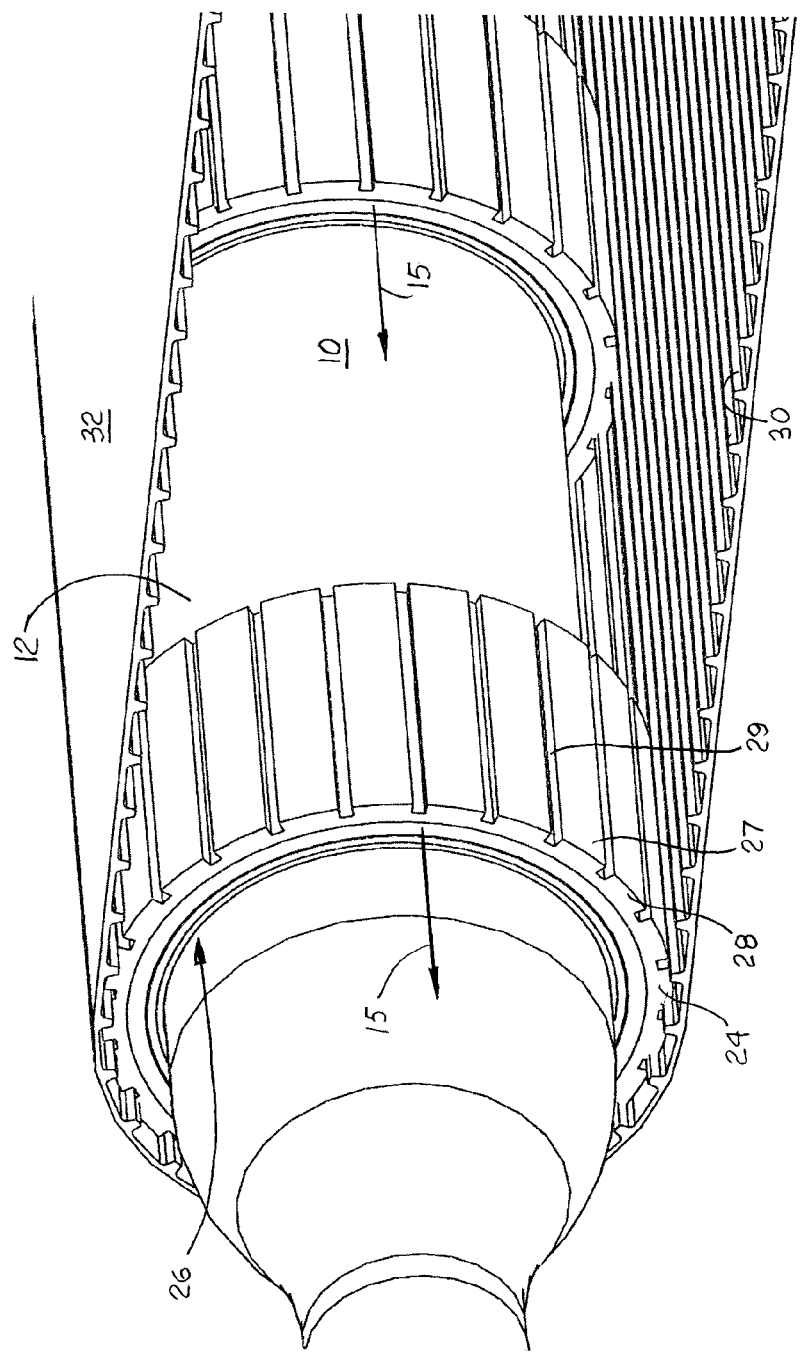
FIG. 3 is an enlarged view of an end portion of the drive system of FIG. 1.
Figure 4:
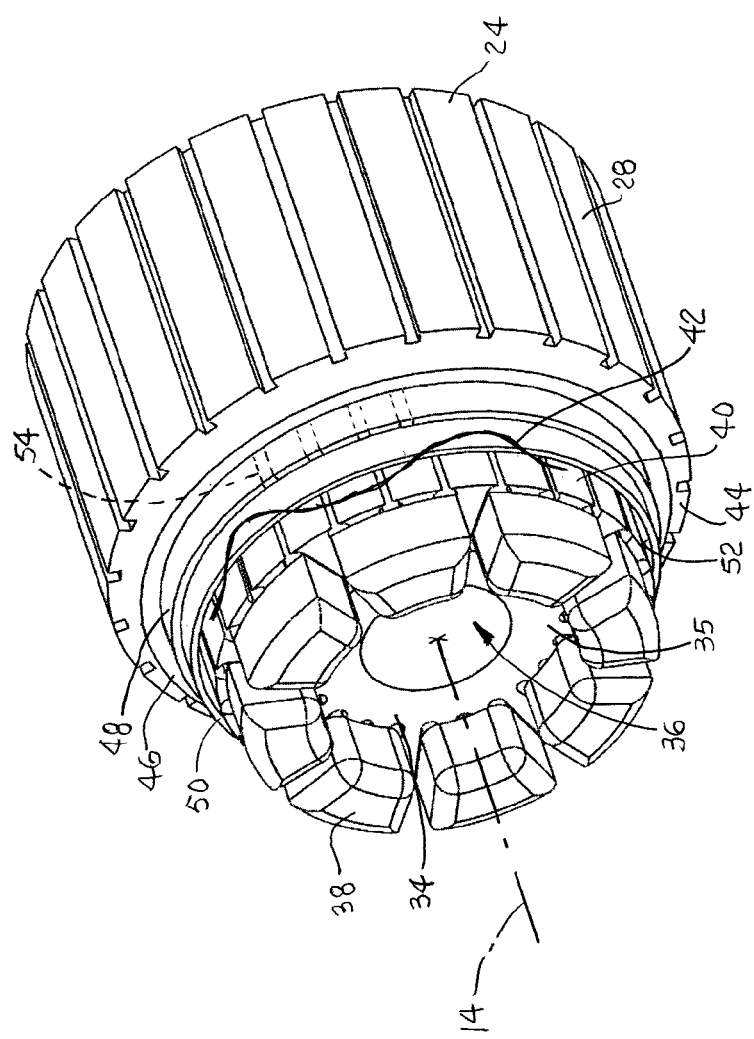
FIG. 4 is a cutaway view of the enlarged drive system of FIG. 3.

As better shown in FIG. 3, drive wheels 24 have central bores 26 that receive the outer bearing surfaces of the housing 10. The drive wheels 24 have peripheral drive structure 28 in the form of alternating teeth 27 and grooves 29 that engage drive-receiving structure on the underside 30 of a conveyor belt 32. The housing 10 is hollow with the outer bearing surface 12 surrounding an interior region in which one or more stators 34, as shown in FIG. 4, are housed. The stator 34 has a steel core 35 rigidly mounted on a shaft (not shown) received in a stator bore 36. The ends of the shaft are stationarily affixed within the mounting support 16 at the transition sections 22. The stationary stator 34 has copper windings 38 and laminated stator poles 40 arranged circumferentially about the axis 14 of the housing. The stator windings 38, when energized by an ac motor drive (not shown), produce a traveling magnetic wave 42 that travels along the stationary stator's poles 40 to rotate about the axis 14. The entire stator is enclosed within the outer bearing surface 12 (not shown in FIG. 4), which is preferably made of a material, such as stainless steel, that does not appreciably affect the traveling magnetic wave 42. Wires connecting the stator windings to the motor drive run through the hollow mounting support 16.

The drive wheel 24 shown in FIG. 4 is constructed of an outer peripheral ring 44 on which the belt drive structure 28 is formed. The peripheral ring is coaxial with a rigid ring 46 inside the peripheral ring 44 and made of steel for strength and stiffness. An electrically-conductive ring 48, such as an aluminum or copper ring, resides inside the rigid ring 46.

Inside the electrically-conductive ring 48 is a bearing ring 50 having an inner bearing surface 52 that is in contact with the outer bearing surface 12 of the stator housing 10.

When the stator is energized, the rotating magnetic wave 42 induces electric currents (eddy currents) in the electrically-conductive ring 48 of the drive wheel 24. The electric currents induced in the ring 48 create an electromagnetic field that interacts with the stator's rotating magnetic wave to create a force acting to push the drive wheel 24 around the housing 10. Thus, the electrically-conductive ring 48 acts as the rotor of an induction motor. The inner bearing ring 50, the rigid ring 46, and the peripheral ring 44—all coaxially secured together until the electrically-conductive ring 48—form a rotor assembly, i.e., the drive wheel 26.

As shown in FIGS. 1 and 2, each drive system can have one or more rotor assemblies. There could be a single stator extending the entire axial length of the housing or individual stators ganged on the shaft at spaced apart axial locations. If multiple stators are used, each could be associated with one of the rotor assemblies.

When the stator of a ganged set of stators is energized, the traveling magnetic wave not only rotates the associated rotor, but it also maintains the rotor in axial alignment with the stator. When the stator is de-energized, the rotor assemblies 24 can be slid in the axial direction 15, as shown in FIG. 3, along the outer bearing surface 12 and onto the narrower tapered section 22 for cleaning. At the same time, the outer bearing surface 12 of the housing can be cleaned. To allow the rotor assemblies 26 to be slid along the housing 10, the inside diameter of the inner bearing surface 52 of the rotor 26 is slightly greater than the outside diameter of the outer bearing surface 12 of the housing.

Figure 6:
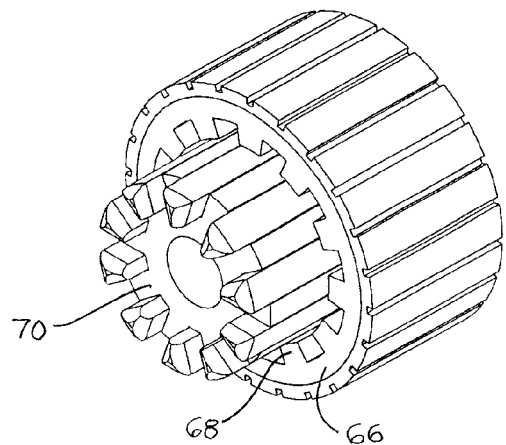
FIG. 6 is an isometric view of an end portion of a reluctance or stepper motor usable in the drive system of FIG. 1.
Figure 7:
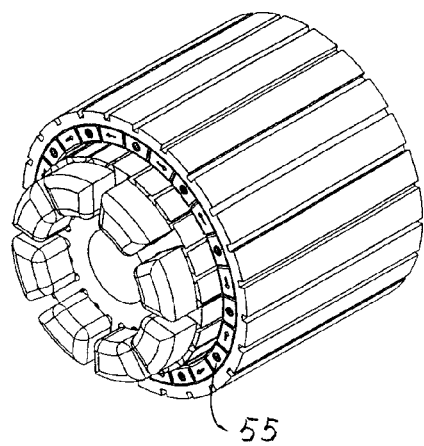
FIG. 7 is an isometric view of an end portion of a permanent-magnet motor usable in the drive system of FIG. 1.

The drive system could alternatively be constructed as a synchronous motor by installing permanent magnets at spaced apart circumferential positions around the rotor assembly. For example, the electrically-conductive ring 48 in FIG. 4 could be replaced by a series of permanent-magnet bars 54 embedded around the entire periphery of a non-magnetic ring to form the poles of a magnetic rotor. Or, as shown in FIG. 7, the magnets could be constructed as a Halbach array 55 to increase the magnetic coupling between the stator and the rotor. Another version is shown in FIG. 6, in which the rigid ring 46 and the electrically-conductive ring 48 in the drive wheel 24 of FIG. 4 is replaced by a ferromagnetic, e.g., iron or silicon steel, ring 66 having salient rotor poles 68 facing radially inward from the ring to form a reluctance motor with a stator 70. The rotating magnetic field produced by the stator induces non-permanent magnetic poles in the rotor that are pulled along by the stator field. The motor may be a synchronous reluctance motor, in which the number of stator and rotor poles are equal, or a variable reluctance motor, in which the numbers of poles are not equal. Appropriate electronic motor controllers are used to control the reluctance motor.

Figure 8A:
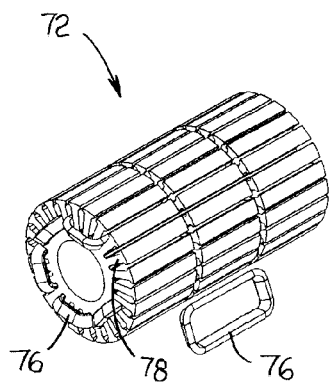
FIGS. 8A and 8B are partly exploded and unexploded isometric views of a multi-section stator usable in a reluctance or stepper motor as in FIG. 6.
Figure 8B:
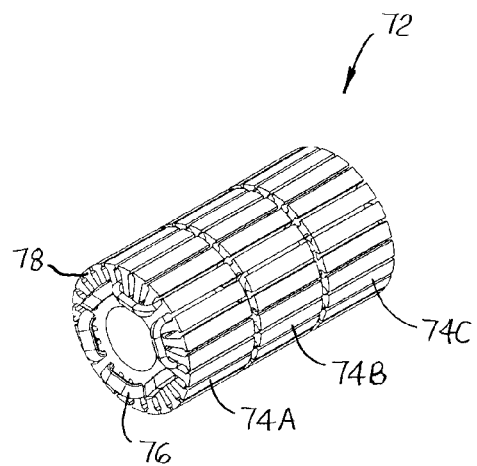
Figure 9A:
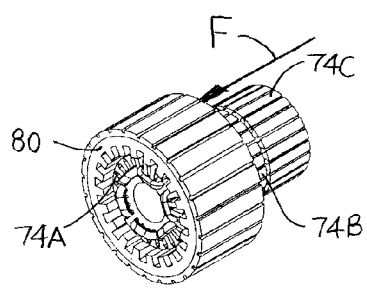
FIGS. 9A and 9B are isometric views of the stator of FIGS. 8A and 8B translating the rotor axially for cleaning and rotating the rotor.
Figure 9B:
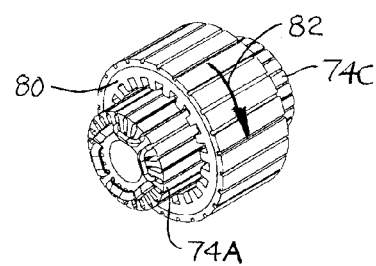
Figure 12A:
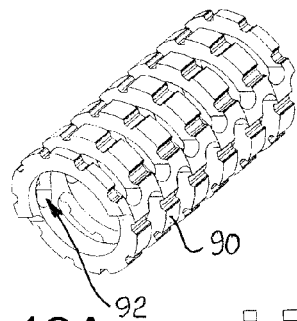
FIGS. 12A, 12B, and 12C are isometric, side elevation, and front elevation views of a third version of a cleanable rotor usable with the drive system of FIG. 1.
Figure 12B:
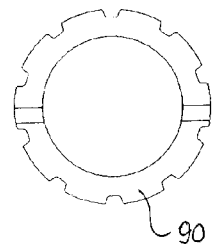
Figure 12C:
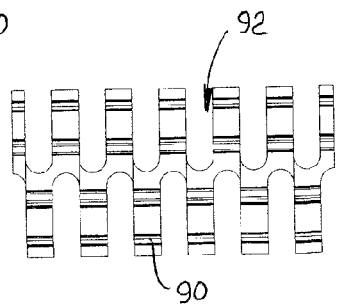
Figure 13A:
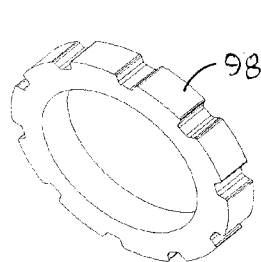
FIGS. 13A, 13B, and 13C are isometric, side elevation, and front elevation views of a fourth version of a cleanable rotor usable with the drive system of FIG. 1.
Figure 13B:
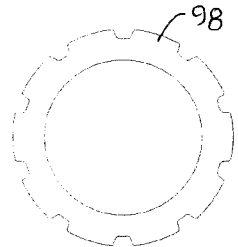
Figure 13C:
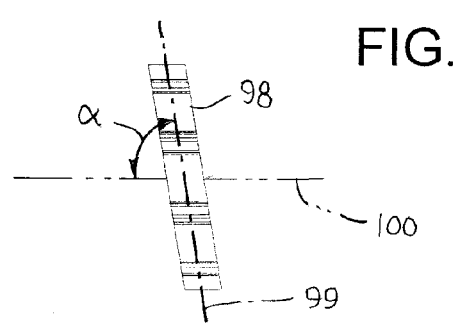

FIGS. 8A and 8B show a switched-reluctance stator arrangement in which the stator 72, shown by way of example, is constructed of three identical stator sections 74A-C. The three stator sections are arranged in line axially. Stator windings 76 are wrapped around stator poles 78 in each stator section. The stator 72 can be used with a permanent-magnet rotor to form a synchronous stepper motor or with a with a reluctance rotor 80 as in FIGS. 9A-9B. When all the stator sections 74A-C are energized as in FIG. 9B, the rotor rotates about the stator as indicated by arrow 82. If the stator section 74A is energized while the other stator sections 74B, 74C are de-energized, the rotor 80 encounters an axial force F that is directed to decrease the reluctance of the magnetic circuit between the stator and rotor. The switched-reluctance rotor 80 is attracted to the energized stator section 74A and slides axially away from the de-energized stator sections 74B, 74C. With the rotor 80 translated axially, the portion of the outer bearing surface normally covered by the rotor can be cleaned. The rotor 80 can be translated back into its normal position by re-energizing the middle stator section 74B and de-energizing the previously energized stator section 74A.

FIGS. 10-13 show four versions of easy-to-clean outer peripheral rings for the rotors. The outer rings 84 in FIGS. 10A-C are characterized by rounded slots 86 formed in the peripheries of the outer rings 84 at axially and circumferentially opposite ends of each ring. Each slot is formed along a chord of the generally circular ring. The slots 86 admit cleaning solution into the seams 88 between adjacent rings. FIGS. 12A-C show rings 90 with deeper rounded slots 92 for even greater cleanability. FIGS. 11A-C depict an axially elongated outer ring 94 with long V-shaped slots 96 for good cleanability. And FIGS. 13A-C show an angled outer ring 98 defining a plane 99 that is oblique to the axis 100 of the ring to provide access to the bearing surface of the stator housing for cleaning.

Figure 5:
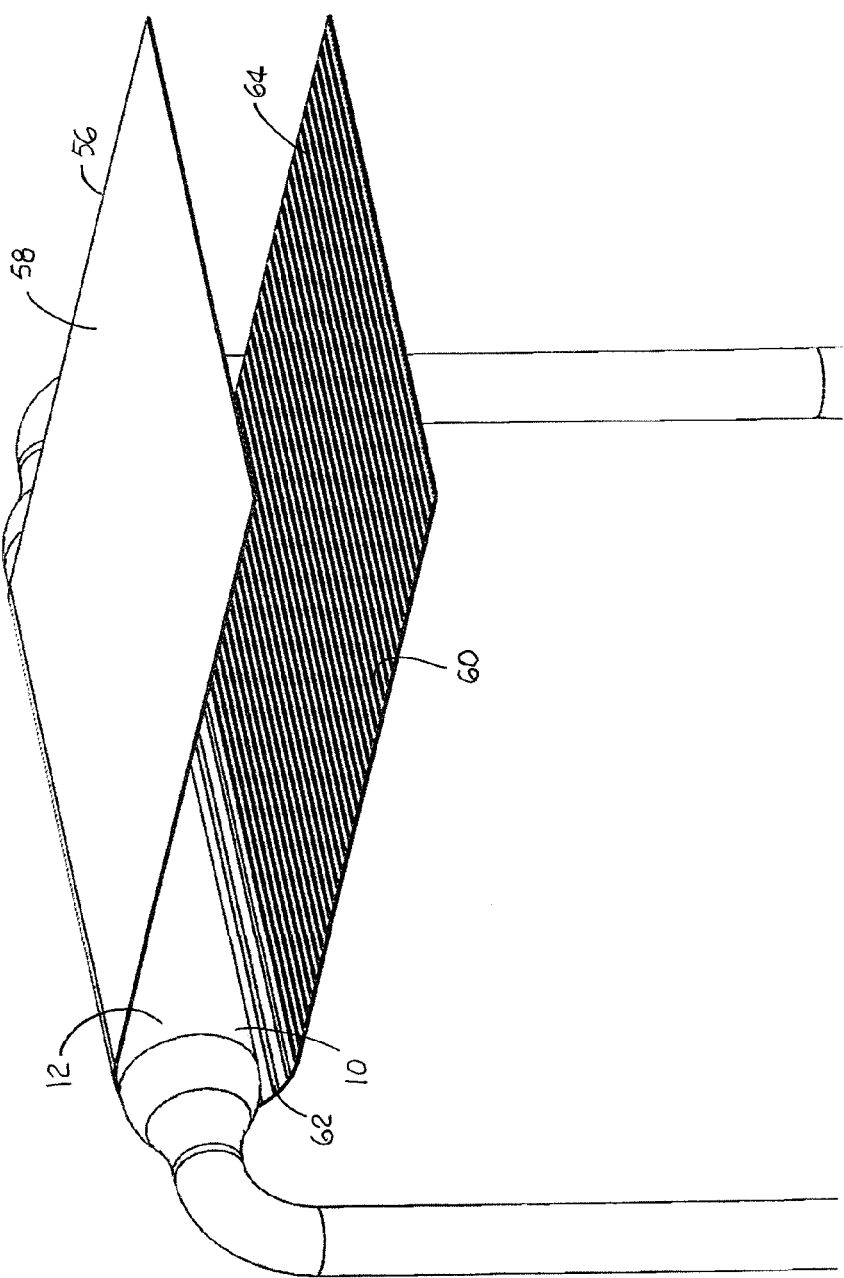
FIG. 5 is an isometric view of another version of a conveyor-belt drive system embodying features of the invention, including a conveyor belt as rotor.

Another version of the drive system is shown in FIG. 5. The stator and the housing 10 are the same as in FIG. 1. Instead of having the rotor as part of a drive wheel that drives the conveyor belt, the belt itself can be constructed as the rotor. The conveyor belt 56 shown in FIG. 5 is a flat belt that is magnetized. For example, the belt can be formed of two plies—an outer ply 58 and an inner magnetic ply 60. The outer ply 58 supports conveyed articles on its outer side and is bonded to the magnetic ply 60 on its inner side. Like an extruded refrigerator magnet, the magnetic ply may be Halbach magnetized to increase the magnetic coupling to the stator. Thus, the magnetic conveyor belt can be driven by the stator without drive wheels. Alternatively, the magnetized ply 60 could include a series of magnetic bars or strips 62 extending across the width of the conveyor belt along the axis 14 and forming rotor poles. To ride smoothly over the outer bearing surface 12 of the housing 10, the inner bearing surface 64 of the belt 56 is smooth.

What is claimed is:

1. A conveyor drive system comprising:
    a housing having an interior region and a stationary outer bearing surface surrounding the interior region;
    a stator housed stationarily in the interior region of the housing along an axis and energizable to produce a magnetic flux wave rotating about the axis;
    a rotor having an inner bearing surface in contact with the outer bearing surface of the housing, wherein the magnetic flux wave interacts with the rotor to rotate the rotor about the axis along the outer bearing surface of the housing.

2. A conveyor drive system as in claim 1 wherein the rotor comprises an electrically conductive drive wheel having a bore coaxial with the axis and bounded by the inner bearing surface.

3. A conveyor drive system as in claim 1 wherein the rotor comprises a magnetic drive wheel coaxial with the axis and having a plurality of poles.

4. A conveyor or drive system as in claim 1 wherein the rotor is made of a ferromagnetic material and includes a plurality of poles protruding radially inward to form a variable-reluctance motor with the stator.

5. A conveyor drive system as in claim 1 wherein the stator comprises a plurality of adjacent stator sections in axial alignment.

6. A conveyor drive system as in claim 5 wherein each of the stator sections is separately energizable.

7. A conveyor drive system as in claim 1 wherein the rotor comprises a drive wheel coaxial with the axis and having an outer periphery with one or more drive surfaces for engaging a conveyor belt.

8. A conveyor drive system as in claim 7 wherein the outer periphery of the drive wheel lies in a plane oblique to the axis.

9. A conveyor drive system as in claim 8 wherein the slots are V-shaped.

10. A conveyor drive system as in claim 8 wherein the slots are rounded.

11. A conveyor drive system as in claim 7 wherein the outer periphery has slots formed at axially and circumferentially spaced locations.

12. A conveyor drive system as in claim 1 wherein the rotor comprises a rigid ring coaxial with the axis and an electrically-conductive ring received within the rigid ring.

13. A conveyor drive system as in claim 12 wherein the rigid ring is made of steel and the electrically-conductive ring is made of aluminum.

14. A conveyor drive system as in claim 1 wherein the rotor comprises a magnetized conveyor belt riding on the outer bearing surface of the housing.

15. A conveyor drive system as in claim 14 wherein the magnetized conveyor belt is Halbach magnetized.

16. A conveyor drive system as in claim 1 wherein the outer bearing surface of the housing is made of a non-magnetic material.

17. A conveyor drive system as in claim 16 wherein the non-magnetic material is stainless steel.

18. A conveyor drive system as in claim 1 wherein the housing is a cylindrical tube elongated along the axis.

19. A conveyor drive system as in claim 1 wherein the housing includes at least one mounting support having an outer surface continuous with the outer bearing surface.

20. A conveyor drive system as in claim 1 wherein the magnetic flux wave produced by the stator maintains the rotor in axial alignment with the stator.

21. A conveyor drive system as in claim 1 wherein the inside diameter of the inner bearing surface of the rotor is slightly greater than the outside diameter of the outer bearing surface of the housing by an amount sufficient to allow the rotor to be slid axially along the outer bearing surface when the stator is not energized.

22. A conveyor drive system comprising:

a tubular housing having a cylindrical outer bearing surface elongated in an axial direction;

a stator stationarily enclosed within the tubular housing and energizable to produce a magnetic flux wave rotating about the axial direction;

a rotor assembly having a central axial bore bounded by an inner bearing ring receiving the outer bearing surface of the tubular housing, the rotor assembly further having an outer drive ring coaxial with the inner bearing ring and having peripheral drive structure for driving a conveyor belt, wherein the magnetic flux wave interacts with the rotor assembly to rotate the rotor assembly along the outer bearing surface of the housing about the axial direction and drive the conveyor belt around a portion of the outer bearing surface.

23. A conveyor drive system as in claim 22 wherein the inner bearing ring is made of an electrically-conductive material and the magnetic flux wave induces currents in the electrically-conductive inner bearing ring that produce a rotor magnetic field that interacts with the magnetic flux wave to produce a force that rotates the rotor assembly about the stationary stator.

24. A conveyor drive system as in claim 22 comprising a plurality of stators stationarily disposed within the housing at spaced apart locations along the axial direction and a plurality of rotor assemblies mounted on the outer bearing surface, each of the rotor assemblies disposed at an axial position corresponding to one of spaced apart locations of the stators.

* * * * *